(12) United States Patent
Nagao

(10) Patent No.: US 7,784,873 B2
(45) Date of Patent: Aug. 31, 2010

(54) AUXILIARY SEAT BELT DEVICE

(76) Inventor: Kiyomi Nagao, 1-14-24-433 Higashioi, Shinagawa-ku, Tokyo 140-0011 (JP)

( * ) Notice: Subject to any disclaimer, the term of this patent is extended or adjusted under 35 U.S.C. 154(b) by 516 days.

(21) Appl. No.: 11/719,990

(22) PCT Filed: Nov. 24, 2005

(86) PCT No.: PCT/JP2005/021448

§ 371 (c)(1),
(2), (4) Date: May 23, 2007

(87) PCT Pub. No.: WO2006/057244

PCT Pub. Date: Jan. 6, 2006

(65) Prior Publication Data

US 2008/0001465 A1 Jan. 3, 2008

(30) Foreign Application Priority Data

Nov. 24, 2004 (JP) .............................. 2004-339177

(51) Int. Cl.
*B60R 22/10* (2006.01)

(52) U.S. Cl. .................... 297/465; 297/483; 24/182; 24/197

(58) Field of Classification Search .................. 297/465, 297/468, 483, 484; 24/182, 197, 630; 224/158–161
See application file for complete search history.

(56) References Cited

U.S. PATENT DOCUMENTS

| | | | | |
|---|---|---|---|---|
| 4,234,229 A | * | 11/1980 | Arnold | 297/467 |
| 4,302,049 A | * | 11/1981 | Simpson | 297/484 |
| 4,758,048 A | | 7/1988 | Shuman | |
| 4,809,410 A | * | 3/1989 | Van Riesen | 24/579.11 |
| 5,074,588 A | * | 12/1991 | Huspen | 297/465 |
| 5,540,403 A | * | 7/1996 | Standley | 244/122 B |
| 5,909,927 A | | 6/1999 | Henshall | |
| 6,033,029 A | * | 3/2000 | Henshall | 297/468 |
| 6,837,547 B2 | * | 1/2005 | Delventhal et al. | 297/484 |

FOREIGN PATENT DOCUMENTS

| | | |
|---|---|---|
| JP | 115761/1985 | 8/1985 |
| JP | 085550/1986 | 6/1986 |

(Continued)

*Primary Examiner*—Peter R. Brown
(74) *Attorney, Agent, or Firm*—Paul F. Neils, Esq.; Akerman Senterfitt

(57) ABSTRACT

The auxiliary seat belt device of the present invention is an auxiliary seat belt device which is removably secured to a vehicle seat belt that is installed by connecting a buckle and a tongue that is inserted into the buckle. The auxiliary seat belt device of the present invention includes: a first belt, a first fixation member that has a first through hole that is attached to one end of the first belt, and a first fastening member that is attached to the other end of the first belt. Here, the tongue comprises a tongue insert piece that is inserted into the buckle and connected to the buckle. With the buckle insert piece, which passes through the first through hole, inserted in the buckle, the first fixation member, the tongue and the buckle are connected together. The auxiliary seat belt device of the present invention can be easily attached to or detached from an existing seat belt without having to modify the seat belt.

2 Claims, 21 Drawing Sheets

FOREIGN PATENT DOCUMENTS

| | | |
|---|---|---|
| JP | 047824/1991 | 5/1991 |
| JP | 126736/1991 | 9/1991 |
| JP | 07-044711 | 2/1995 |
| JP | 09-277902 | 10/1997 |
| JP | 11-147448 | 6/1999 |
| JP | 2000-238563 | 9/2000 |
| JP | 2001-294120 | 10/2001 |
| JP | 2002-363807 | 12/2002 |
| JP | 2003-250670 | 9/2003 |

* cited by examiner (a)

(b)

(a)

(b)

(a)

(b)

(a)

(b)

(c)

(a)

(b)

(c)

(a)

(b)

AUXILIARY SEAT BELT DEVICE

This invention relates to an auxiliary seat belt device that is used together with a seat belt that is installed in a means of transportation such as an automobile, airplane, boat and the like.

An auxiliary seat belt device for carrying an infant safely in a vehicle is known.

A conventional safety belt for an infant is disclosed in Japanese patent application H9-277902. This infant safety belt comprises a ring through which a seat belt passes, or a fixture through which a seat belt can be passed that is located on a belt that is fixed to the infant.

A prior multi-function car seat is disclosed in Japanese patent application 2003-250670. This multi-function car seat provides a high level of safety as a car seat. Also, the central feature of this multi-function car seat is that it is economical and material saving in that it can be used for a long period of time from newborn to childhood, and can be used for many purposes.

A prior auxiliary seat belt device is disclosed in Japanese patent application H11-147448. This auxiliary seat belt comprises a T-shaped upper piece and an inverted T-shaped lower piece that are respectively located on the upper end and lower end of a center piece, and comprises a folded piece that is folded downward from the upper part of the upper piece. Also, this auxiliary seat belt comprises a cover.

A prior seat belt for an infant is disclosed in Japanese patent application H7-44711. This seat belt for an infant is a seat belt for maintaining the safety of an infant when riding in an automobile while holding an infant that does not like being in a car seat. This seat belt for an infant comprises a part that holds the infant, and a belt that connects that part to a seat belt.

A prior safety protective suit for a child is disclosed in Japanese patent application 2002-363807. This safety protective suit for a child comprises: a waist portion that has a cut slit in the back through which a seat belt passes; a crotch belt that is attached to the waist portion; and a fastening member for attaching a belt for carrying an infant in the front or on the back.

SUMMARY OF THE INVENTION

The object of the present invention is to provide an auxiliary seat belt device that can be easily attached to or detached from an existing seat belt without having to modify the seat belt.

The reference numbers used in the explanations of the preferred embodiments of the invention below will be used to explain the method for solving the aforementioned problems. These reference numbers are added in order to clarify the correlation between the claims and the preferred embodiments. However, these numbers will not be used in the interpretation of the technical scope of the invention that is given in the claims.

The auxiliary seat belt device of the present invention is an auxiliary seat belt device which is removably secured to a vehicle seat belt that is installed by connecting a buckle (3, 19) and a tongue (2, 17) that is inserted into the buckle.

An auxiliary seat belt device of the present invention which is removably secured to a vehicle seat belt (1) that is installed in the seat belt (1) by connecting together a tongue (2) that is installed in the seat belt (1) and has a tongue grip section (2a) and a tongue insert piece (2b), and a buckle (3) that has a receiving hole (3b) inserted by a tongue insert piece (2b) of the tongue (2). The auxiliary seat belt device of the present invention comprises: a first belt (11(11a)); a first fixation member (8, 18) that is attached to one end of the first belt (11) and is box-shaped with the tongue (2) side open, has a first through hole (8a) passed through by the tongue insert piece (2b) of the tongue (2) in the bottom surface, and has a receiving section (8b) that the grip section (2a) of the tongue (2) is locked in the tongue (2) side; and a first fastening member (11d) that is attached to the other end of the first belt (11). The auxiliary seat belt device of the present invention comprises; the first fixation member (8, 18) which is connected in the state of being attached between the buckle (3) and the tongue (2), the tongue insert piece (2b) of the tongue (2) which passes through the first through hole (8a) and is inserted into the receiving hole (3b) of the buckle (3); and the tongue (2) and the buckle (3) are connected together when the grip section (2a) is locked in the receiving section (8b). An auxiliary seat belt device of the present invention can be easily attached/detached to/from an existing seat belt without having to modify the seat belt.

Also, the auxiliary seat belt device of the present invention which is removably secured to a vehicle seat belt comprises; a second fixation member (9) that attaches to one end of the second belt (11); and a second fastening member (11d) that attaches to the other end of the second belt (11). The second fixation member (9) comprises; a flat plate member (9a) in which the second through hole (9d) that can be passed through in the state of the seat belt (1) being folded is provided, and a fastening piece (10) that is a different object from the flat plate member (9a) is connected to the flat plate member (9a) and that is longer than the opening length in the opening section of the second through hole; and is passed through the second through hole (9d) in the state of the seat belt (1) being folded and is fastened in seat belt (1) by inserting the fastening piece (10) in the loop that is formed by the folded section and fastening the fastening piece (10) in the loop by pulling the seat belt (1).

Moreover, in the auxiliary seat belt device of the present invention, it can also comprise a body fixation member (4) that is connected to the first belt (11(11a)) or the second belt (11(11b)) and is attached to an infant. The first fastening member or second fastening member (11d) can be attached to the body fixation member (4); the body fixation member (4) comprises an outer pouch bottom surface section (40 and outer pouch side surface sections (4g) that are attached on both sides of the outer pouch bottom surface section (40 having holes (4d) through which the infant's arms are passed. The outer pouch bottom surface section (40 comprises a rigid plate (5) and a cushion (6) that is a member for improving to fit comfortably. By using the auxiliary seat belt device of the present invention, the infant is held in a suitable posture.

Furthermore, the auxiliary seat belt device of the present invention can also comprise: the body fixation member (4) comprising two shoulder fixation belts (7a) having shoulder fixation belt insert pieces (7d) on the free ends, and a waist fixation belt (7b) having a locking mechanism (7c) to connect to the shoulder fixation belt insert pieces (7d) with attachable/detachable on the free ends. By using the auxiliary seat belt device of the present invention, the infant is securely fixed. The second fastening member (11d) can be attached to the body fixation member (4) and the auxiliary seat belt device of the present invention can fix an infant at two different positions on a seat belt.

The present invention provides an auxiliary seat belt device that can be easily attached to or detached from an existing seat belt without having to modify the seat belt.

BRIEF DESCRIPTION OF THE DRAWINGS

FIG. 4A is a top view of the body fixation member, and FIG. 4B is a side view of the body fixation member.

FIG. 5A shows the state in which the body fixation member is open, FIG. 5B shows the state in which an infant is placed in the body fixation member, FIG. 5C shows the state in which shoulder fixation belts are connected to a waist fixation belt, and FIG. 5D shows the state in which the body fixation member is closed.

FIG. 6A shows the front of the exterior, and FIG. 6B shows the rear of the exterior.

FIG. 7A shows the front of the back plate, and FIG. 7B shows the rear of the back plate.

FIG. 8A shows the front of the cushion, and FIG. 8B shows the rear of the cushion.

FIG. 12A shows the state before inserting the tongue insert piece through the fixation member, FIG. 12B shows the state in which the tongue insert piece has been inserted through the fixation member, and FIG. 12C shows the state in which the tongue insert piece has been inserted into the buckle.

FIG. 14A shows the state in which the seat belt is folded, FIG. 14B shows the state in which the folded portion of the seat belt is passed through the flat plate, FIG. 14C shows the state in which the fixation member is inserted into the loop of the seat belt, and FIG. 14D shows the state in which the flat plate member is secured to the seat belt.

FIG. 16A shows the state before inserting the tongue insert piece through the fixation member, FIG. 16B shows the state in which the tongue insert piece is inserted through the fixation member, and FIG. 16C shows the state in which the tongue insert piece is inserted into the buckle.

FIG. 19A shows the state in which the inside member is installed in the external member receiving section, and FIG. 19B shows the state in which the inside member is removed from the external member receiving unit.

DESCRIPTION OF THE PREFERRED EMBODIMENTS

The auxiliary seat belt device of the present invention will be described based on the supplied drawings.

Embodiment 1

A first embodiment of the invention will be explained using FIG. 1 to FIG. 14. The auxiliary seat belt device of this first embodiment of the present invention is used with a normal 2-point seat belt or 3-point seat belt.

Figure 1:
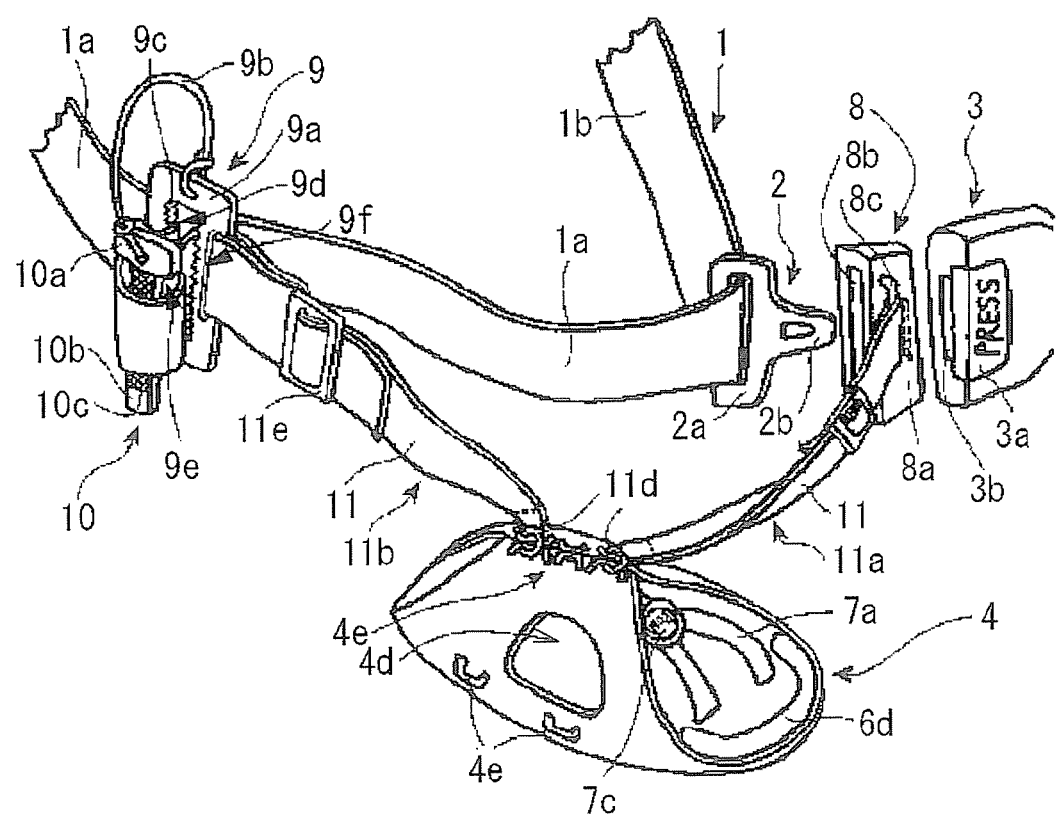
FIG. 1 is a perspective view of the auxiliary seat belt device of a first embodiment of the invention.
Figure 2:
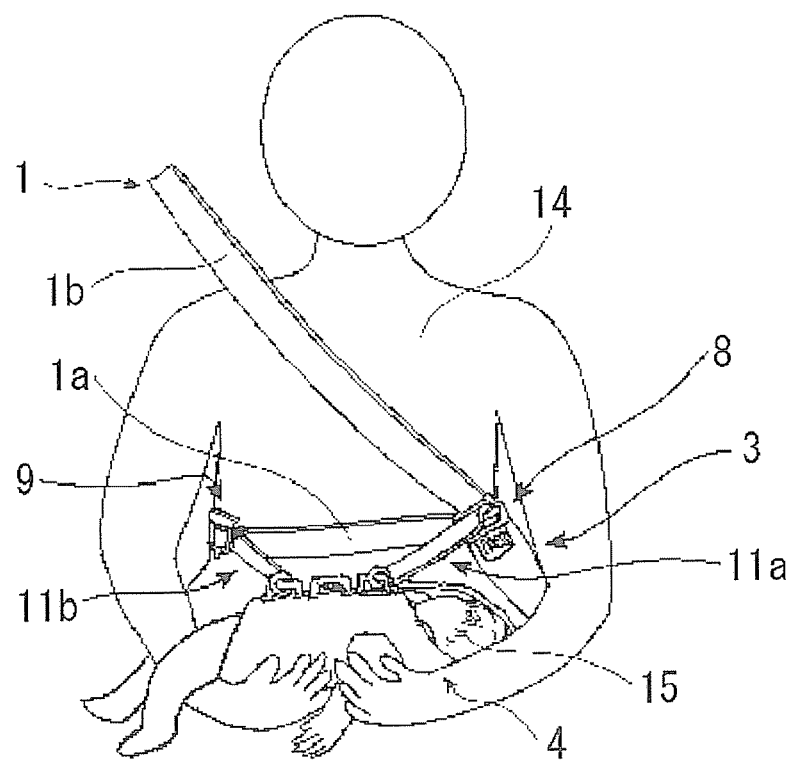
FIG. 2 is a front view of the state of using the auxiliary seat belt device of a first embodiment of the invention.
Figure 3:
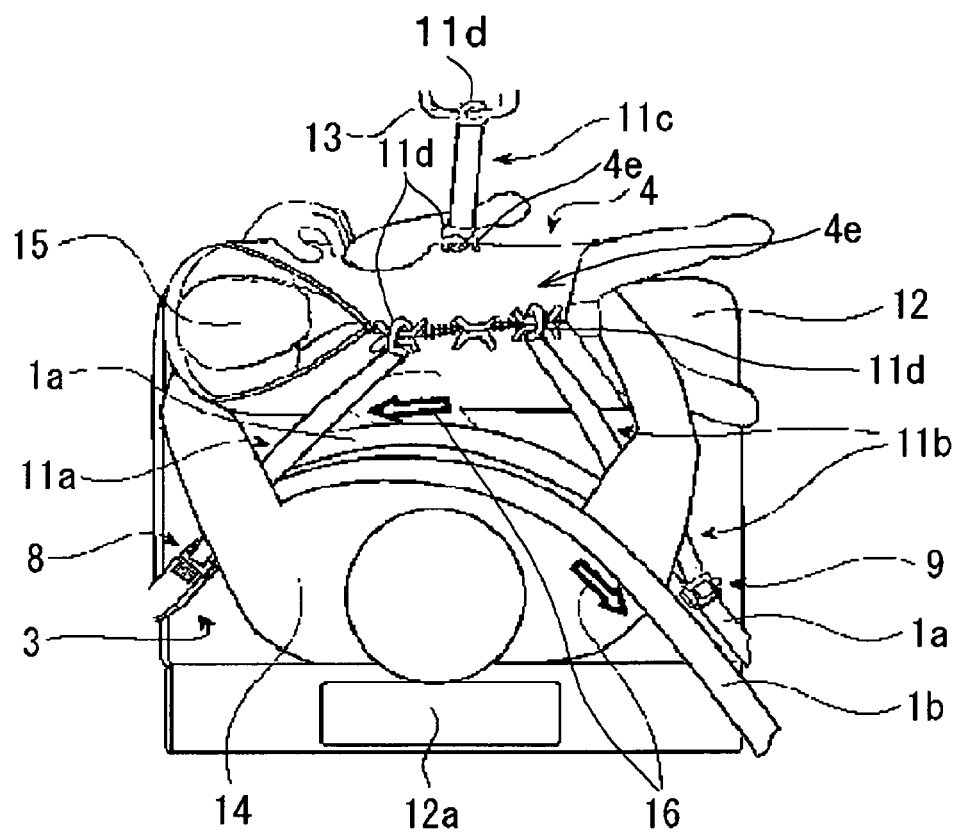
FIG. 3 is a top view of the state of using the auxiliary seat belt device of a first embodiment of the invention.

As shown in FIG. 1 to FIG. 3, the auxiliary seat belt device comprises a body fixation member 4, a fixation belt 11a and an auxiliary fixation belt 11b. The body fixation member 4 is capable of fixation at least from the head to waist of an infant's body. One end of the fixation belt 11a can be attached to or detached from the body fixation member 4, and a first fixation member 8 is located on the other end. The insert tongue 2 and the receiving buckle 3 of the attachment/detachment mechanism of the seat belt 1 fit together with the first fixation member 8 located in between. The first fixation member 8 does not interfere with the operation or function of the attachment/detachment mechanism of the seat belt 1, so the tongue 2 and buckle 3 can be attached and detached, and can securely fit together. One end of the auxiliary fixation belt 11b can be attached to or detached from the body fixation member 4, and on the other end there is a second fixation member 9 that connects the auxiliary fixation belt 11b to the seat belt 1.

As shown in FIG. 1, a tongue 2 is installed on the seat belt 1. The seat belt 1 has a seat belt waist section 1a that is further on the lower side than the tongue 2, and a seat belt chest section 1b that is further on the upper side than the tongue 2.

As shown in FIG. 2, the seat belt waist section 1a is the portion that comes in contact with the stomach area of the crewmember or passenger 14 wearing the seat belt 1. The seat belt chest section 1b is the portion that comes in contact with the chest area of the crewmember or passenger 14 wearing the seat belt 1. The crewmember or passenger 14 is a person accompanying an infant 15.

Figure 4:
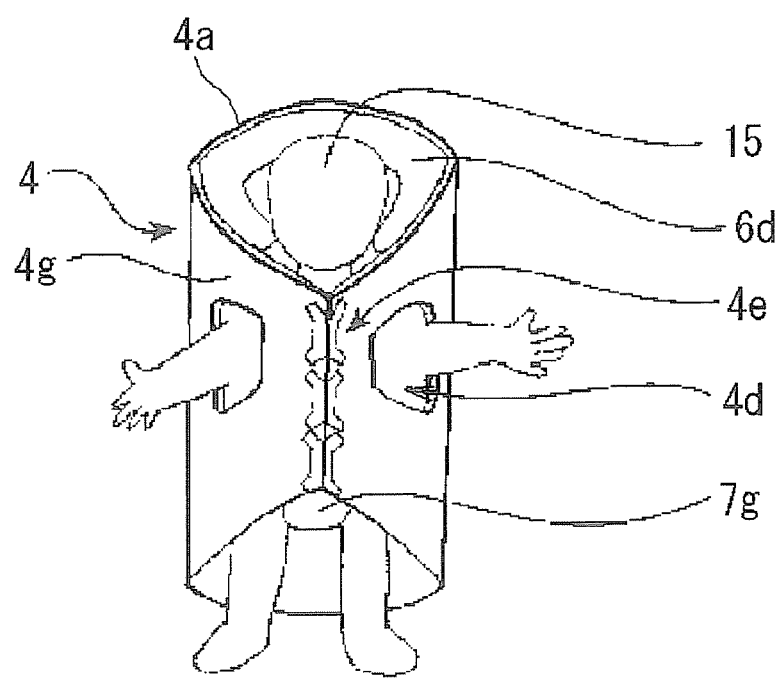
FIGS. 4A and 4B are drawings showing a body fixation member, where
Figure 4:
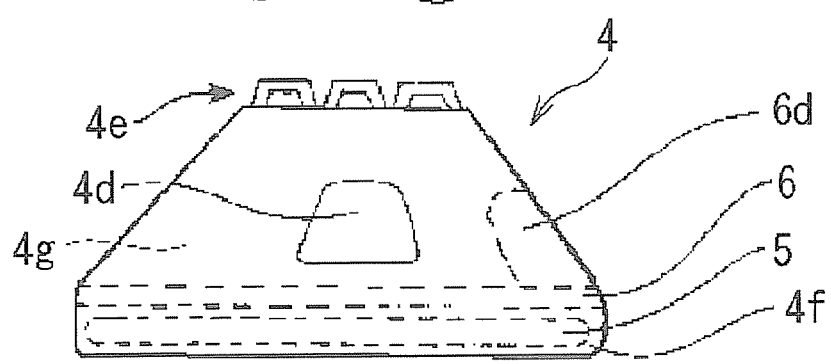
Figure 5:
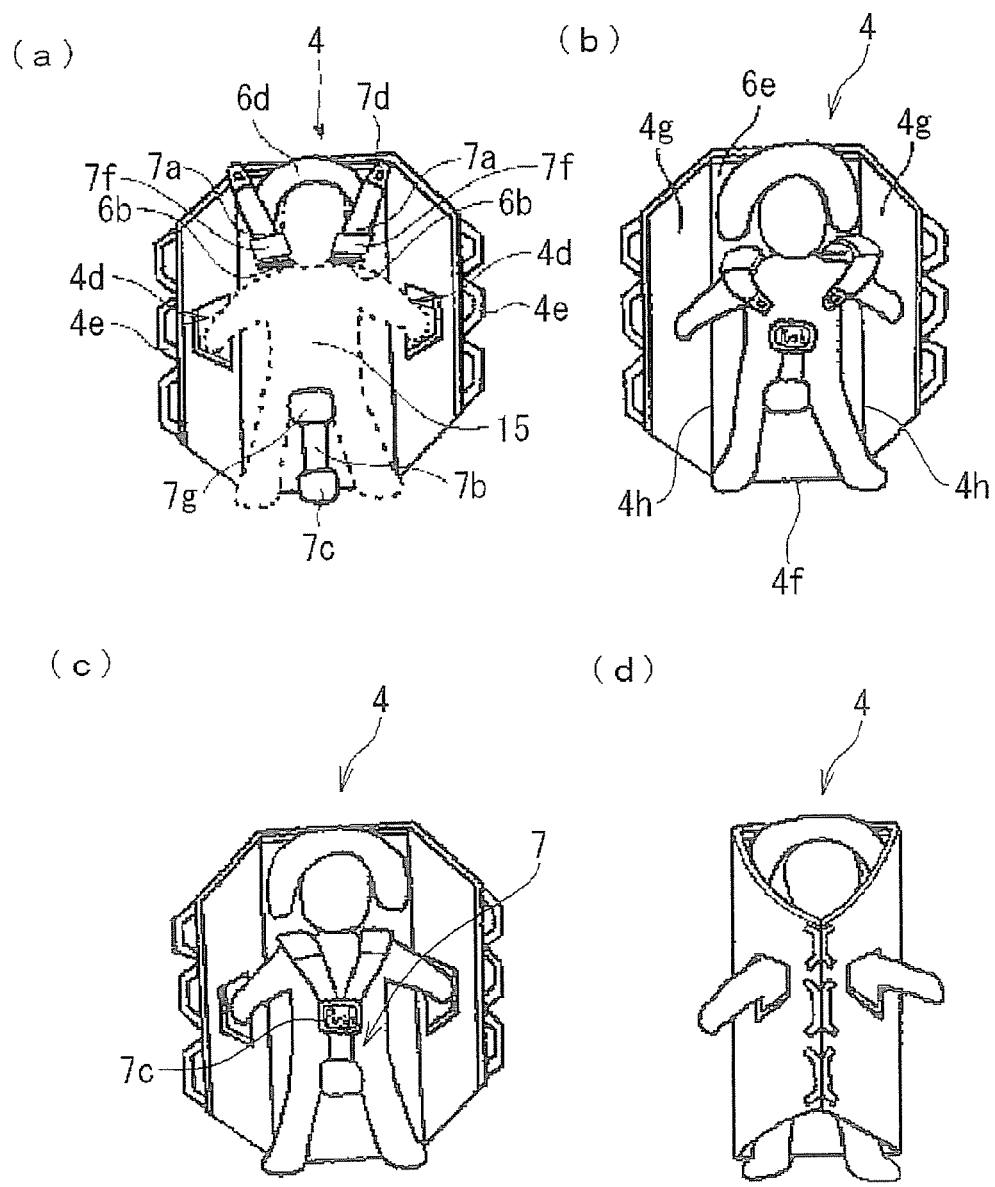
FIGS. 5A to 5D are drawings for explaining the method for using the body fixation member, where

(A) As shown in FIG. 4 and FIG. 5, the body fixation member 4 comprises: an outer pouch 4a for wrapping around and holding the body of an infant 15; a plurality of installation fixtures 4e for connecting the fixation belt 11a and auxiliary fixation belt 11b; a back plate 5 for fixation at least from the head to the waist of the body of the infant; a cushion 6 and a body fixation belt 7 for fixing the body of the infant.

Figure 6:
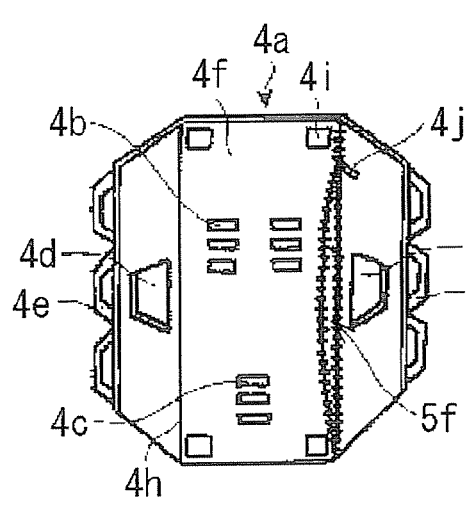
FIGS. 6A and 6B are drawings for explaining the exterior of the body fixation member, where
Figure 6:
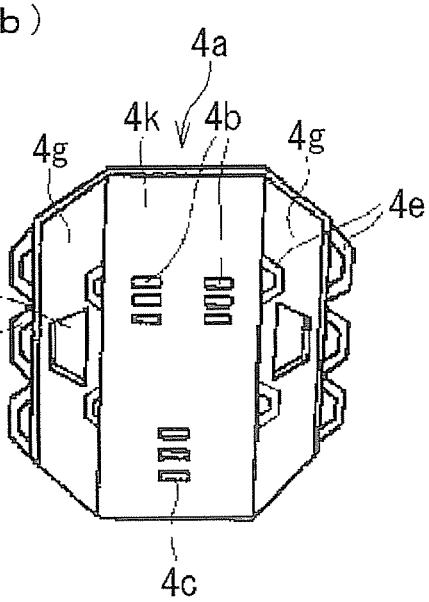

(B) As shown in FIG. 5 and FIG. 6, the outer pouch 4a comprises: an outer pouch bottom section 4f; outer pouch side sections 4g that are located on both sides of the outer pouch bottom section 4f; and a plurality of installation fixtures 4e. The length of the outer pouch bottom section 4f is at least longer than the length from the head to the waist of the infant 15 when the infant 15 is in a laying position on top of the outer pouch bottom section 4f. The outer pouch bottom section 4f and outer pouch side sections can freely bend at bending sections 4h. The outer pouch bottom section 4f is pouch shaped with a slide-type fastener 4j. The back plate 5 is inserted into the pouch from the opening that is formed by opening the slide-type fastener 4j, and the back plate 5 is secured to the outer pouch bottom section 4f by closing the slide-type fastener 4j. Fastening holes 4i for exposing fasteners 5a that are formed on the back plate 5 are formed in the four corners of the surface of the pouch shaped outer pouch bottom section 4f. A little above the center of the top surface of the outer pouch bottom section 4f is a plurality of rows of two shoulder fixation belt holes 4b arranged side by side horizontally, and below the center is a plurality of rows of waist fixation belt holes 4c with one open. On the rear surface of the outer pouch bottom section 4f as well, there are shoulder fixation belt holes 4b and waist fixation belt holes 4c that are the same as on the top surface, and these form continuous holes with the respective fixation belt holes 4b and waist fixation belt holes 4c on the top surface.

There are holes 4d in the outer pouch side sections 4g on both sides of the outer pouch 4a having left and right symmetry for the arms of the infant to go through. The outer pouch side sections 4g bend at the bending sections 4h that are located on both sides of the outer pouch bottom section 4f so that they wrap around the infant. A plurality of installation fixtures 4e for connecting the fixation belt 11a and auxiliary fixation belt 11b are located on the edge sections and side surfaces of the outer pouch side sections 4g. In addition, it is also possible for there to be opening/closing fixtures such as fasteners located on the edge sections of the outer pouch side sections 4g so that it is possible to freely open or close the edge sections. It is preferred that a lightweight, breathable cloth having about the same strength as the seat belt be used as the material for the outer pouch 4a.

The outer pouch side sections 4g that are located on both sides of the outer pouch bottom section 4f are closed along the edge sections of the outer pouch side sections 4g on which the installation fixtures 4e are located. Also, the installation fixtures 4e are located near the bending sections 4h on the outside surface of the outer pouch side sections 4g.

Figure 7:
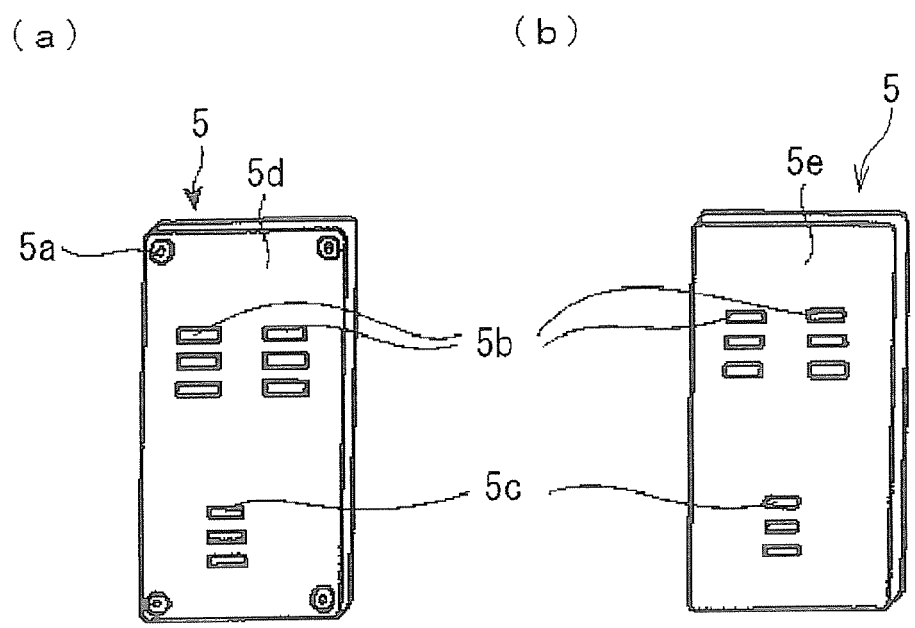
FIGS. 7A and 7B are drawings for explaining the back plate of the body fixation member, where

(C) As shown in FIG. 7, the back plate 5 is made of a lightweight, hard material having excellent strength, and there are female fastening member 5a located in the four corners of the top surface 5d of the back plate for fastening the cushion. A little above center of the back plate 5 there is a plurality of rows of two back plate shoulder fixation belt holes 5b arranged side by side horizontally, and below the center is a plurality of rows of back plate waist fixation belt holes 5c with one open, that correspond to the shoulder fixation belt holes 4b and waist fixation belt holes 4c that are formed in the outer pouch bottom section 4f.

The body restraining fixation member 4 comprises a back plate 5 made from a hard material, so the infant is held in a suitable posture.

The back plate shoulder fixation belt holes 5b and back plate waist fixation belt holes 5c penetrate through the back plate 5 from the top surface 5d of the back plate to the rear surface 5e of the back plate.

Figure 8:
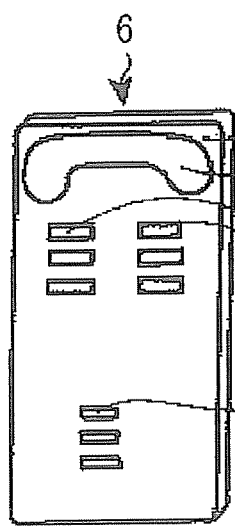
FIGS. 8A and 8B are drawings for explaining a cushion of the body fixation member, where
Figure 8:
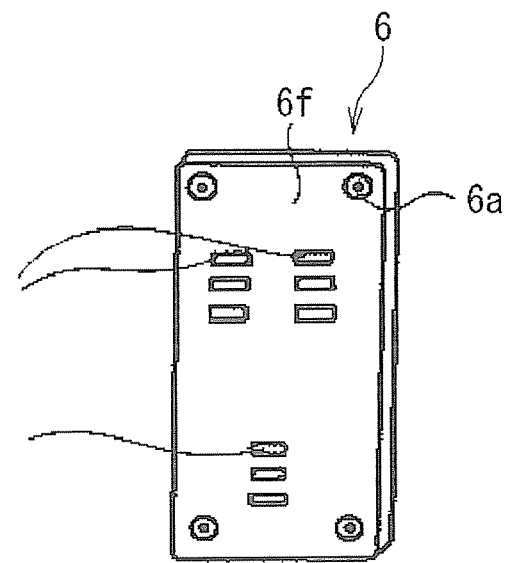

(D) As shown in FIG. 8, the cushion 6 comprises a head protection section 6d in the head section of the top cushion surface 6e. The cushion 6 has the function of alleviating the impact to the body of an infant when in a collision, and has the function of increasing the riding comfort of the infant. The cushion 6 is shaped so that it covers the back surface section of the body fixation member 4. When securing the outer pouch 4a, back plate 5 and cushion so that they can be attached or detached, the back plate 5 is inserted into the outer pouch bottom section 4f, the cushion 6 is placed on top of the outer pouch bottom section 4f, and the male fastening member 6a that are located on the rear cushion surface 6f are connected to the female fastening member 5a that are located on the back plate 5.

A little above center of the cushion 6 there is a plurality of rows of two cushion shoulder fixation belt holes 6b arranged side by side horizontally, and below the center is a plurality of rows of cushion waist fixation belt holes 6c with one open, that correspond to the shoulder fixation belt holes 4b and waist fixation belt holes 4c that are formed in the outer pouch bottom section 4f.

Figure 9:
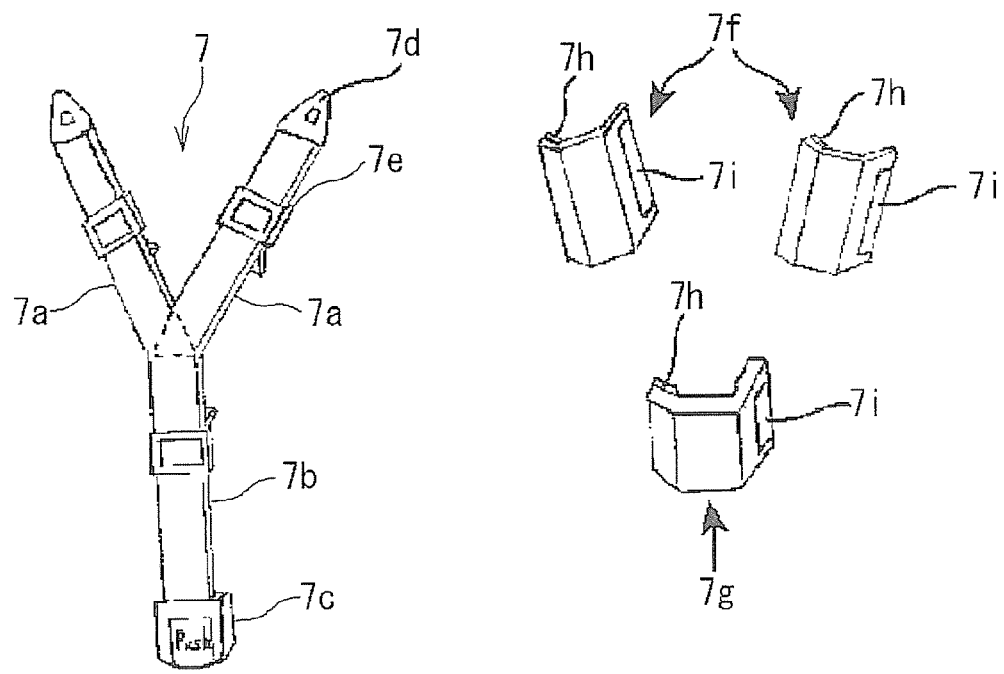
FIG. 9 is a drawing for explaining body fixation belts of the body fixation member.

(E) As shown in FIG. 9, the body fixation belt 7 is a Y-shaped belt for securing the infant to the body fixation member 4, and comprises two shoulder fixation belts 7a and a waist fixation belt 7b. The two shoulder fixation belts 7a are inserted through two holes that are selected from the shoulder fixation belt holes 4b that are located in the outer pouch rear surface 4k so that they fit the shape of the infant's body, and are passed through the back plate shoulder fixation belt holes 5b in the back plate 5 that is mounted on the outer pouch bottom section 4f, and cushion shoulder fixation belt holes 6b. Similarly, the waist fixation belt 7b is inserted through one of the holes that is selected from the waist fixation belt holes 4c that are formed in the rear outer pouch surface 4k so that it fits the infant, and is passed through the back plate waist fixation belt hole 5c that is aligned with this hole, and the cushion waist fixation belt hole 6c. On the tip end of the waist fixation belt 7b there is a locking mechanism 7c that is a receiving fixture that receives a tongue insert piece 7d. The locking mechanism 7c fixes the two insert pieces 7d that are inserted into the locking mechanism 7c, and when the section on which 'PUSH" is written is pressed, releases the tongue insert pieces 7d. There is an adjustment fixture 7e on the body fixation belt 7 for adjusting the length.

As shown in FIG. 5, there are shoulder cushions 7f located on the body fixation belts 7 in the portions of the shoulder fixation belts 7a that come in contact with the shoulders of the infant 15, and there is a waist cushion 7g in the portion of the waist fixation belt 7b that is located between the thighs of the infant 15. As shown in FIG. 9, surface fasteners 7h and surface fasteners 7i are connected to the shoulder cushions 7f and waist cushion 7g so that they can be connected together. The shoulder cushions 7f and waist cushion 7g can be attached and detached and can be adjusted to a desired position.

(F) As shown in FIG. 1, and FIG. 10 to FIG. 12, a first fixation member 8 is installed in the attachment/detachment mechanism of the seat belt of a vehicle so that it can be attached or detached, and is the part that fixes the fixation belt 11a to the seat belt 1. The first fixation member 8 is installed between the tongue 2 and buckle 3 of the attachment/detachment mechanism of the seat belt. The first fixation member 8 does not obstruct the function of the attachment/detachment mechanism. The first fixation member 8 is box-shaped with the top surface open, and there is a slit-shaped first through hole 8a formed in the bottom surface.

The tongue insert piece 2b is inserted into the first fixation member 8 from the top surface of the first fixation member 8. When doing this, the grip section of the tongue 2a is stopped by the tongue receiving section 8b, and only the tongue insert piece 2b passes through the first through hole 8a that is formed in the bottom surface of the first fixation member 8. Also, the tongue insert piece 2b is inserted into the receiving hole 3b that is formed in the buckle 3 of the seat belt 1 and is connected to the buckle 3.

Figure 19:
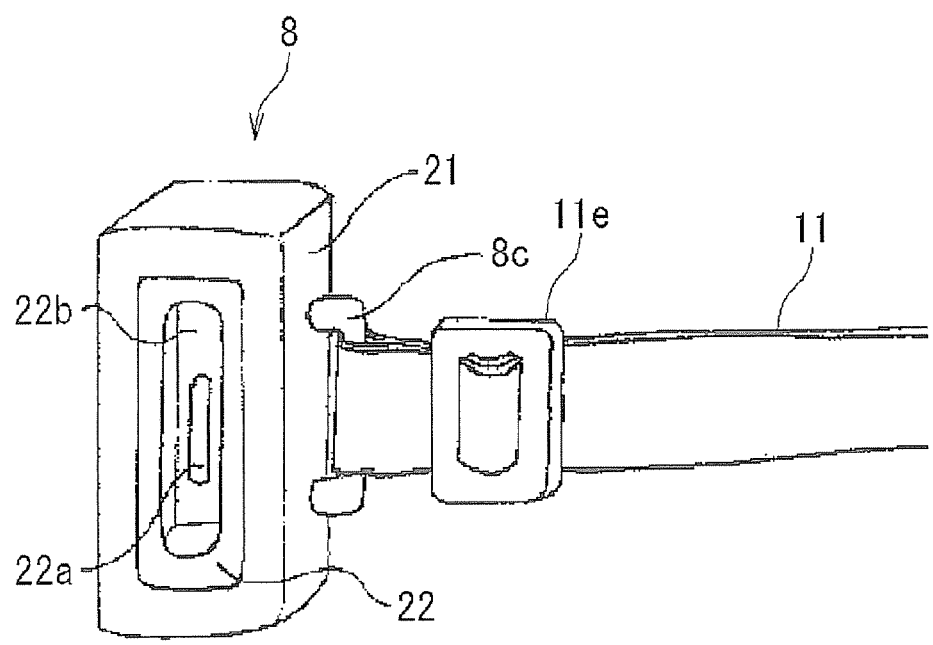
FIGS. 19A and 19B show an inside member for size adjustment that is located in the external member receiving section of the fixation member, where
Figure 19:
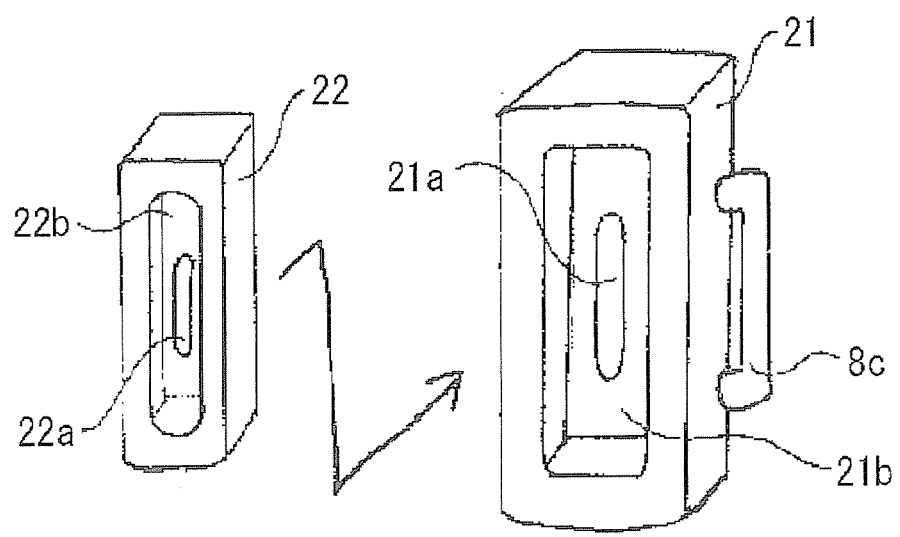

Another example of the first fixation member 8 is shown in FIG. 19. The first fixation member 8 comprises an outer member 21 and an inner member 22. An outer member receiving section 21b is formed in the outer member 21, and an outer member through hole 21a is formed in the bottom surface of the outer member receiving section 21b. An inner member receiving section 22b is formed in the inner member 2 that fits in the outer member receiving section 21, and an inner member through hole 22a is formed in the bottom surface of the inner member receiving section 22b. The inner member receiving section 22b corresponds to the tongue receiving section 8b. The inner member through hole 22a and outer member through hole 21 correspond to the first through hole 8a.

As shown in FIG. 19, the first fixation member 8 can also comprise an exchangeable inner member 22 that fits in the outer member receiving section 21b so that it is possible to use seat belts of various specifications. By exchanging this inner member 22, the first fixation member 8 can be used with various sizes of tongues 2 such as that of an automobile, airplane, boat and the like.

Figure 10:
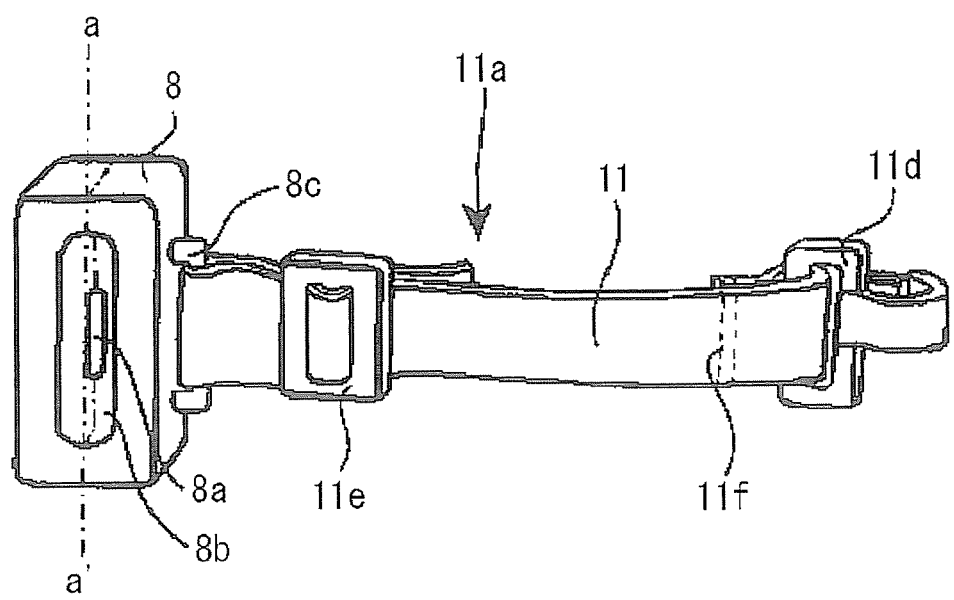
FIG. 10 is a perspective drawing that shows a fixation belt.
Figure 11:
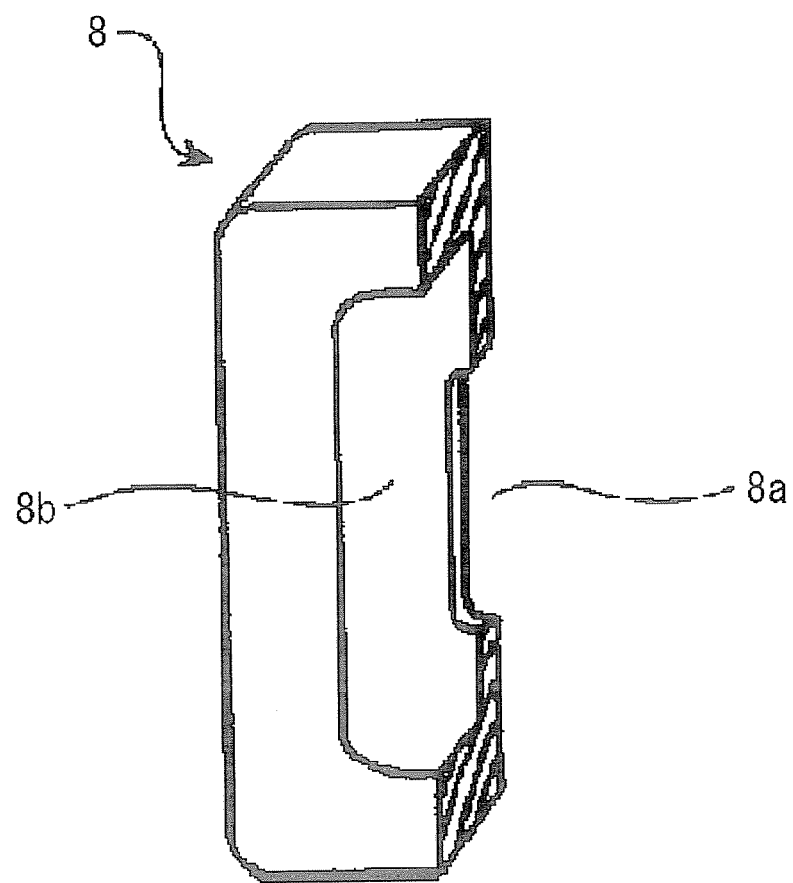
FIG. 11 is a cross-sectional view of the cross section a-a' of the fixation member of the fixation belt shown in FIG. 10.

(G) As shown in FIG. 10, the fixation belt 11a comprises a first fixation member 8 on the tip end of the belt 11, and first fastening member 11d such as a hook on the other end. In the fixation belt 11a, the belt 11 is inserted through the belt installation section 8c that is located on the first fixation member 8 and is folded back, and the tip end of the folded section of the belt 11 is fastened by a length adjustment fixture 11e. It is possible to adjust the length of the fixation belt 11a.

The belt 11 of the fixation belt 11a is inserted through the belt through hole that is formed in the first fastening member 11d and folded back, and is sewn closed at a seam 11f.

Figure 13:
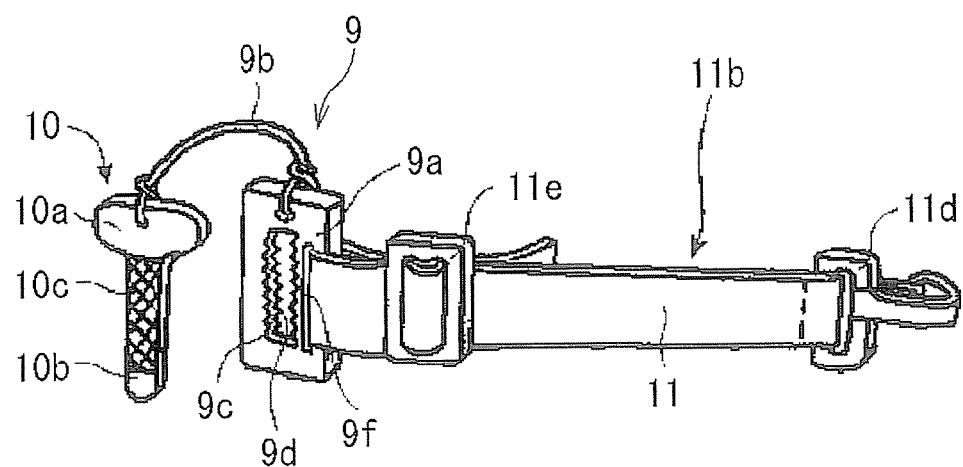
FIG. 13 is a perspective drawing of an auxiliary fixation belt.
Figure 14:
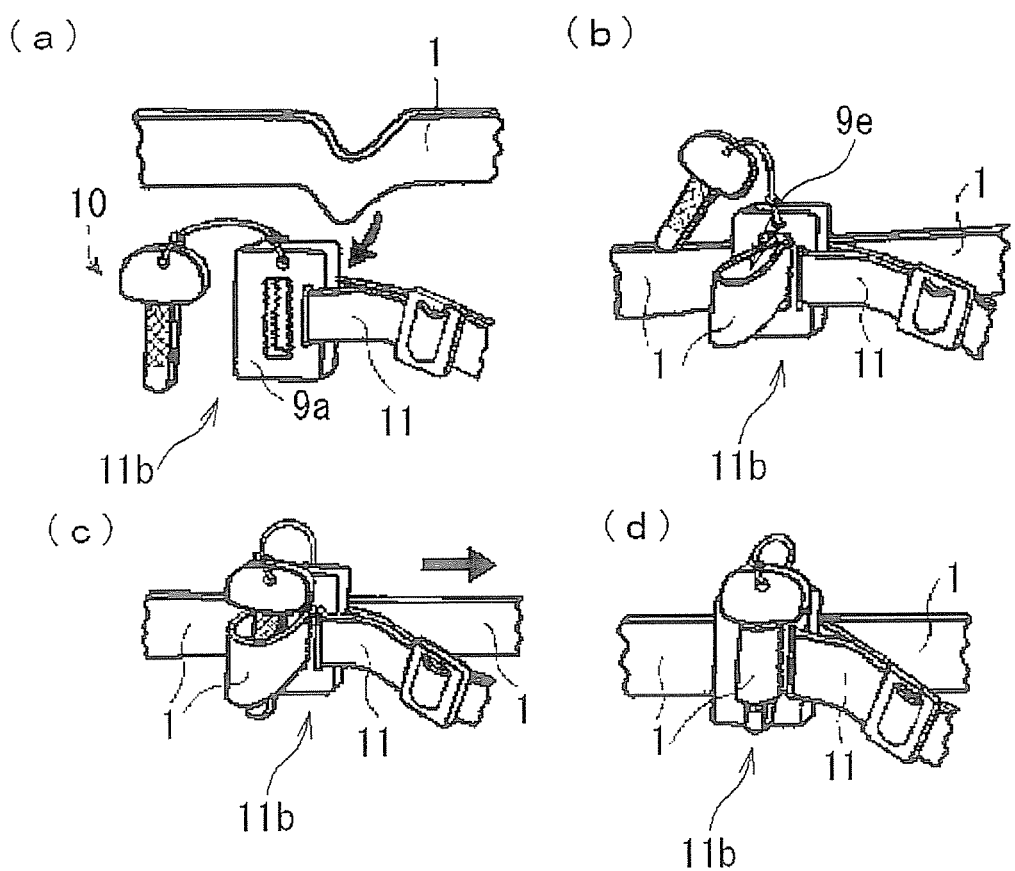
FIGS. 14A to 14D are drawings for explaining the method of using the auxiliary fixation belt, where

(H) As shown in FIG. 13 and FIG. 14, a second fixation member 9 connects to the auxiliary fixation belt 11b and seat belt 1, and is the part that fixes the auxiliary fixation belt 11b to the seat belt 1. The second fixation member 9 comprises: a flat plate member 9a having a second through hole 9d in the center through which the seat belt 1 passes, and a belt attachment hole 9f; and a rod-shaped fixation piece 10 that is connected to the flat plate member 9a by a strap 9b. The fixation piece 10 has a grip section 10a, and a long insert rod 10b that is longer than the length of the opening of the second through hole 9d through which the seat belt passes. In order to use the second fixation member 9 to fix the auxiliary fixation belt 11b to the seat belt 1, the seat belt 1 is folded to form a loop, and the loop of the seat belt passes through the second through hole 9d of the flat plate member 9a, and the fixation piece 10 is inserted into the loop 9e that has passed the second through the hole 9d, then the seat belt 1 is pulled so as to eliminate the loop. By forming an uneven section 9c along the seat belt second through hole 9d of the flat plate member 9a, and by forming an uneven surface 10c on the insert rod 10b of the fixation piece 10, the auxiliary fixation belt 11b is securely fixed to the seat belt 1.

(I) As shown in FIG. 13, the auxiliary fixation belt 11b has the second fixation member 9 attached to the tip end of the second belt 11, and a second fastening member 11d is attached to the other end.

The length of the auxiliary fixation belt 11b can be adjusted by the length adjustment fixture 11e.

Figure 17:
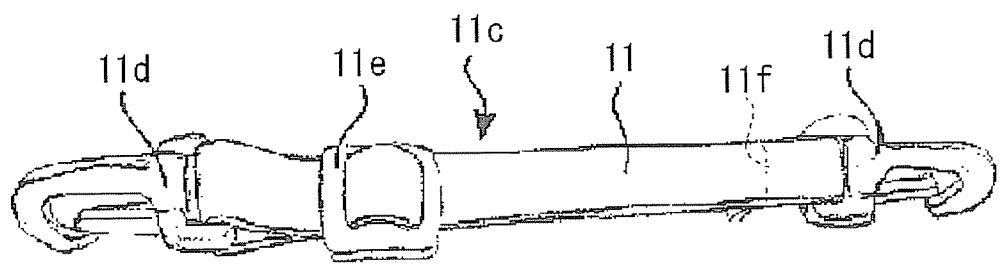
FIG. 17 is a perspective drawing of a second auxiliary fixation belt.

(J) As shown in FIG. 17, a second auxiliary fixation belt 11c comprises a third belt 11 and third fastening members 11d on both ends of the third belt 11. One end of the second auxiliary fixation belt 11c can be connected to the body fixation member 4, and the other end can be connected to a structure inside the vehicle. In order to increase the effect of the body fixation member 4, it is possible to use a plurality of second auxiliary fixation belts 11c together.

The length of the second auxiliary fixation belt 11c can be adjusted by a length adjustment fixture 11e. The third belt 11 is inserted through a belt through hole that is formed in the third fastening member 11d and folded back, and then sewn at the seam 11f.

Figure 20:
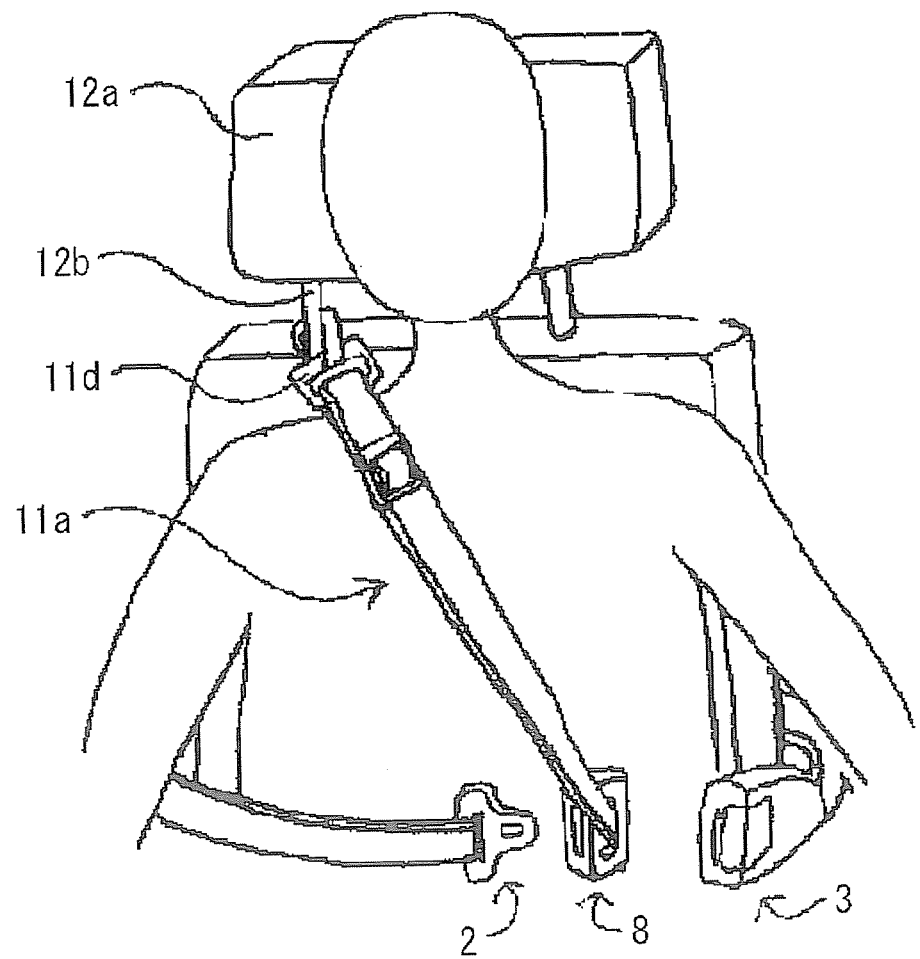
FIG. 20 shows the state in which the fixation belt of this invention is worn together with a normal 2-point type seat belt.

(K) The fixation belt 11a and the auxiliary fixation belt 11b are not only used together with the body fixation member 4, but as shown in FIG. 20, can also be used as an auxiliary seat belt device for an adult passenger or crewmember.

When using the auxiliary seat belt device of this first embodiment of the present invention, the installation fixtures 4e of the body fixation member 4 can be attached to or detached from the fixation belt 11a and auxiliary fixation belt 11b by way of the fastening member 11d.

Figure 12:
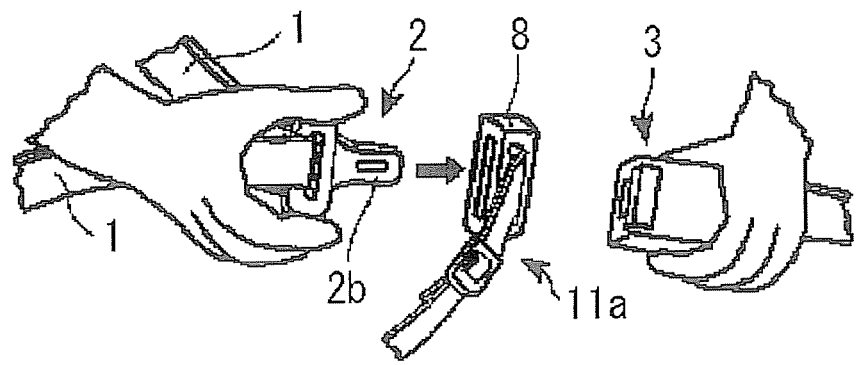
FIGS. 12A to 12C are drawings for explaining the method for using a fixation belt, where
Figure 12:
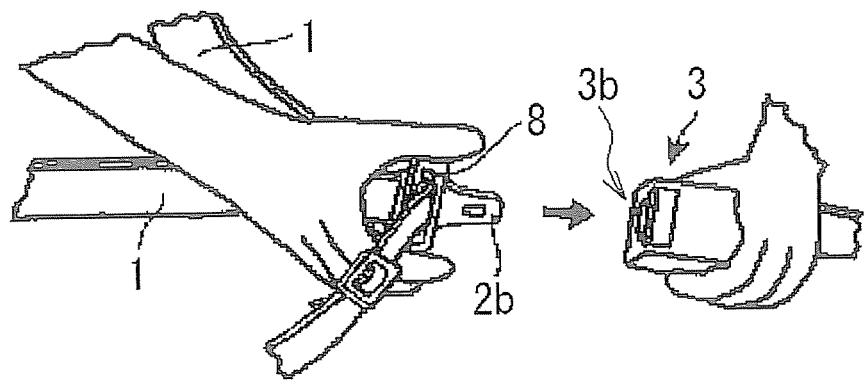
Figure 12:
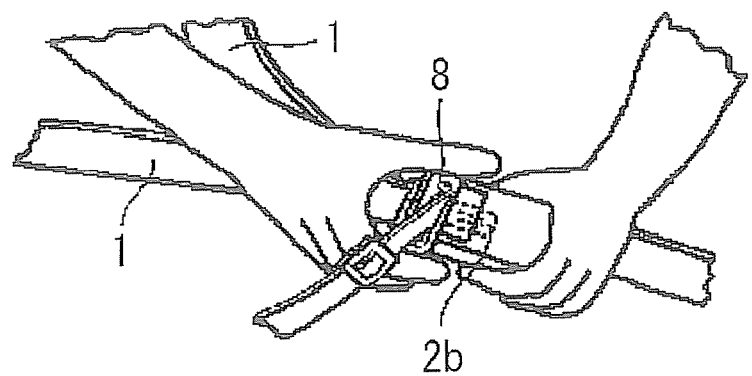

As shown in FIG. 12, the first fixation member 8 that is located on the other end of the fixation belt 11a is used between the tongue 2, which is the insert portion of the attachment/detachment mechanism of the seat belt 1, and the buckle 3, which is the receiving portion. As described in section (F) above, the tongue insert piece 2b is inserted into the first fixation member 8 from the opening surface of the first fixation member 8. When doing this, the tongue grip 2a is stopped by the tongue receiving section 8b so that only the tongue insert piece 2b passes through the first through hole 8a that is formed in the bottom surface of the first fixation member 8. Also, the tongue insert piece 2b is inserted into the tongue insert receiving hole 3b that is formed in the buckle 3 of the seat belt, and is connected to the buckle 3.

As described in section (H) above, the second fixation member 9 that is located on the other end of the auxiliary fixation belt 11b comprises a second through hole 9d. A loop that is formed by the seat belt 1 passes through the second through hole 9d, and the fixation piece 10 is inserted into the passed loop 9e. When doing this, only the insert rod 10b section is inserted into the loop. Here, the insert rod 10b is held so that it is parallel with the lengthwise direction of the opening of the slit-shaped second through hole 9d in the flat plate member 9a, and by pulling the seat belt 1 to eliminate the loop, the auxiliary fixation belt 11b and seat belt are fixed.

The location where the second fixation member 9 may be attached to any arbitrary location on the seat belt 1, however, as shown in FIG. 3, it is preferred that it be above the waist belt 1a on the opposite side of the first fixation member 8 with respect to the waist of the adult 14 so that it is easy to balance and hold the infant.

As shown in FIG. 2 and FIG. 3, the body fixation member 4 should come in close contact with just the crewmember or passenger 14 that holds the infant. The fixation belt 11a and auxiliary fixation belt 11b are attached to the seat belt so that the lengths are matched, taking into consideration the best means of balancing the infant. Furthermore, the body fixation member 4 is used with the infant being held by both arms. The length of the belt is adjusted using the length adjustment fixture 11e to correspond to the size of the infant 15 or the shape of the body of the crewmember or passenger 14 that holds the infant 15.

As methods for using the body fixation member 4 is a method of using it with the infant laying in a horizontal position, a method of holding the infant in an upright position facing the adult, or a method of holding the infant in an upright position so that the infant faces in the same direction as the crewmember or passenger holding the infant, however, the method of using it with the infant laying in a horizontal position is recommended.

Figure 21:
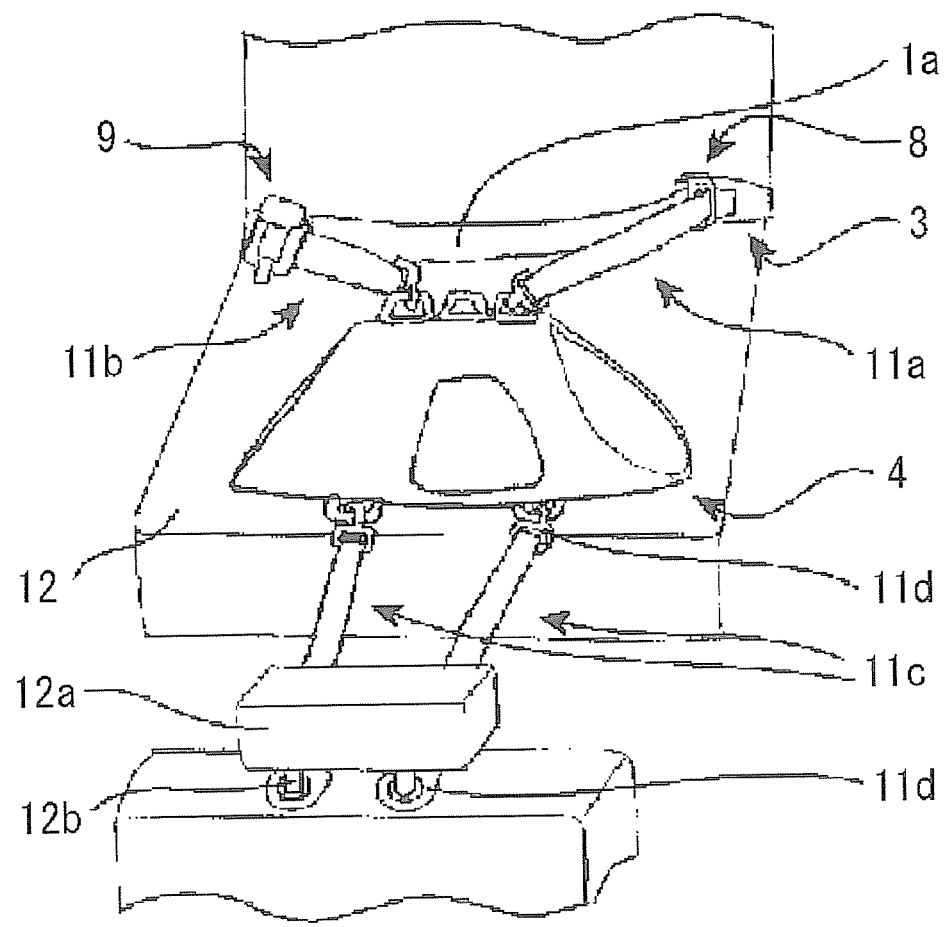
FIG. 21 shows the state in which the auxiliary seat belt device of a first embodiment of the invention is used for an infant alone.

As shown in FIG. 21, in the case of fixing an infant alone to a seat belt 1, such as when a plurality of infants are riding in a vehicle, the fixation belt 11a and auxiliary fixation belt 11b are used to fix the body fixation member 4 to the seat 12, and furthermore, it is recommended that a second auxiliary fixation belt 11c be used to fix to the headrest support bar 12b that supports the seat headrest 12a, or to a handle as shown in FIG. 3. Here, the second auxiliary fixation belt 11c comprises fastening member 11d that are attached to both ends of the belt 11.

In FIG. 21, the second auxiliary fixation belts 11c are attached to the installation fixtures 4e that are located near the fold section 4h of the outside surface of the outer pouch side section 4g. Here, the second auxiliary fixation belts 11c can be attached to the installation fixtures 4e that are located on the edge section of the outer pouch side section 4g.

Second Embodiment

A second embodiment of the present invention will be explained using FIG. 4 to FIG. 12, FIG. 15 and FIG. 16. The auxiliary seat belt device of this second embodiment of the invention is a 2-point seat belt such as that of an airplane seat, and it is used together with a seat belt that is attached or detached in a position in the center of the stomach area of a crewmember or passenger.

Figure 15:
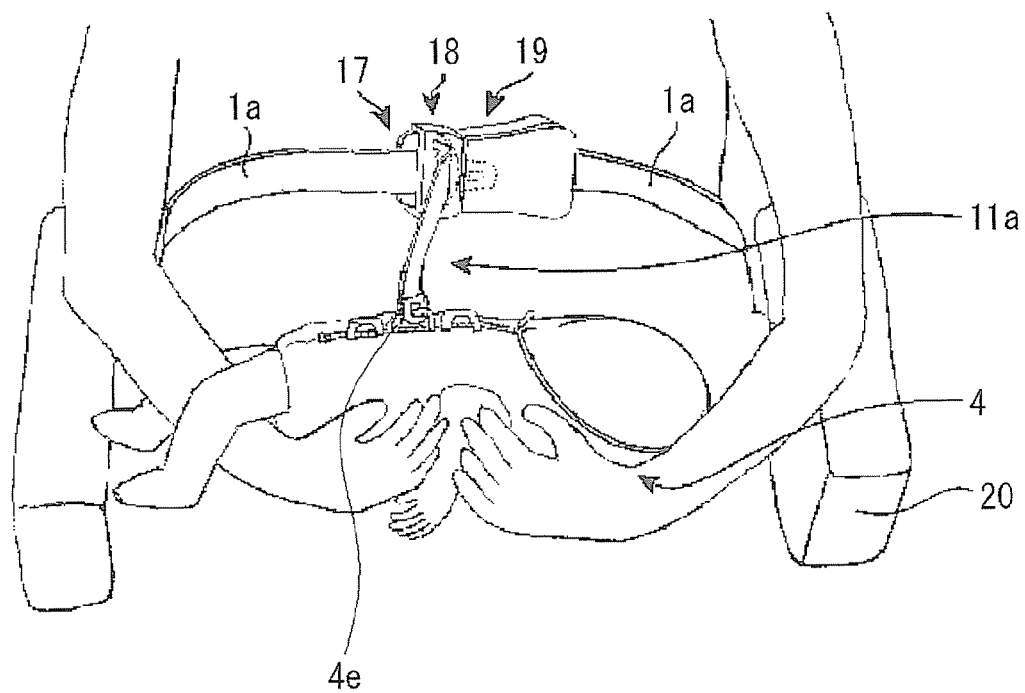
FIG. 15 is a perspective drawing showing an auxiliary seat belt device of a second embodiment of the invention.

As shown in FIG. 15, in the case of an airplane seat belt, the tongue 17 and buckle 19 that are both attached to the free ends of two seat belt waist sections 1a are attached or detached at a location in the center of the stomach area of a crewmember or passenger. The seat shown in FIG. 15 comprises armrests 20.

As shown in FIG. 15, the auxiliary seat belt device comprises a body fixation member 4 and a fixation belt 11a. The body fixation member 4 is capable of fixing the body of an infant from at least the head to the waist. One end of the fixation belt 11a can be attached to or detached from the body fixation member 4, and on the other end there is a first fixation member 18 for an airplane seat belt. The insert tongue 17 and receiving buckle 19 of the attachment/detachment mechanism of the seat belt fit together with the first fixation member 18 located in between. The first fixation member 18 does not interfere with the operation and function of the seat belt attachment/detachment mechanism, so the tongue 17 and buckle 19 can be attached or detached, and securely fit together. In the seat belt of this second embodiment, the size of the attachment/detachment mechanism is a little larger than in the first embodiment, however, the method of operation and function of the attachment/detachment mechanism are mainly the same as in the first embodiment. The construction of the auxiliary seat belt device of this second embodiment is the same as that explained in (A) to (G) and (I) to (K) of the first embodiment. To summarize the construction of the auxiliary seat belt device of this second embodiment, it has basic construction comprising: a fixation belt 11a of which one end is connected to the seat belt attachment/detachment mechanism so that it can be attached to or detached from a location in the center of the stomach area of a crewmember or passenger; and a body fixation member 4 that is located on the other end of the fixation belt 11a, and when necessary, it further comprises a second auxiliary fixation belt 11c.

As shown in FIG. 15, when using the auxiliary seat belt device of this second embodiment, the fixation belt 11a is attached to the installation fastener 4e of the body fixation member 4 by way of a first fastening member 11d.

Figure 16:
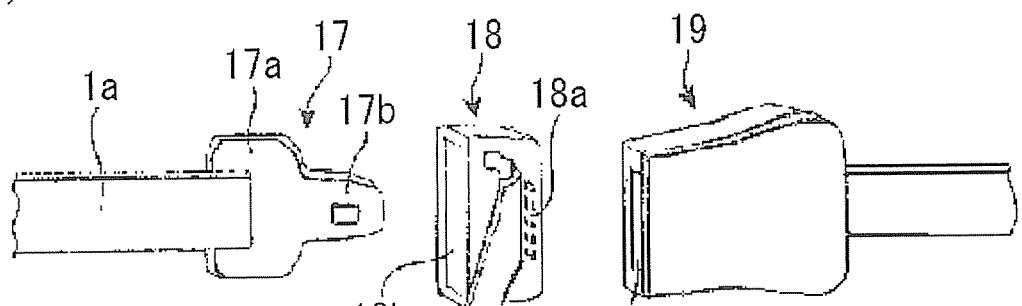
FIGS. 16A to 16C are drawings for explaining the method for using the auxiliary seat belt device of a second embodiment, where
Figure 16:
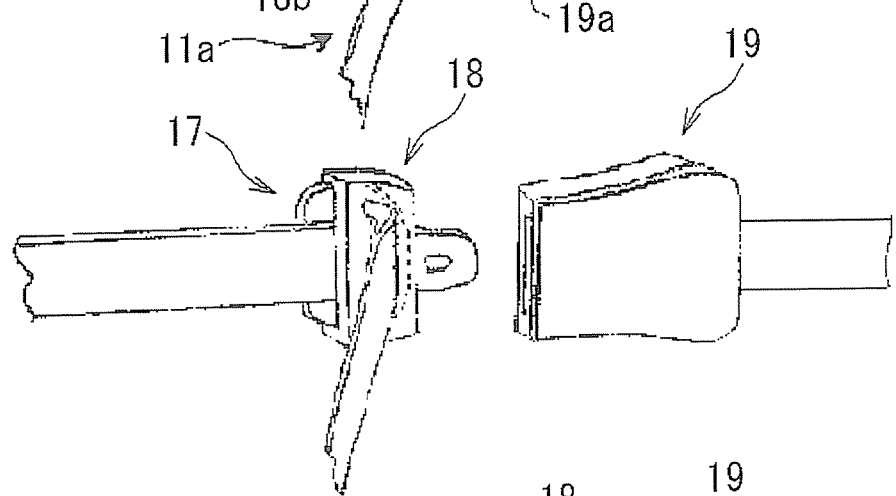
Figure 16:
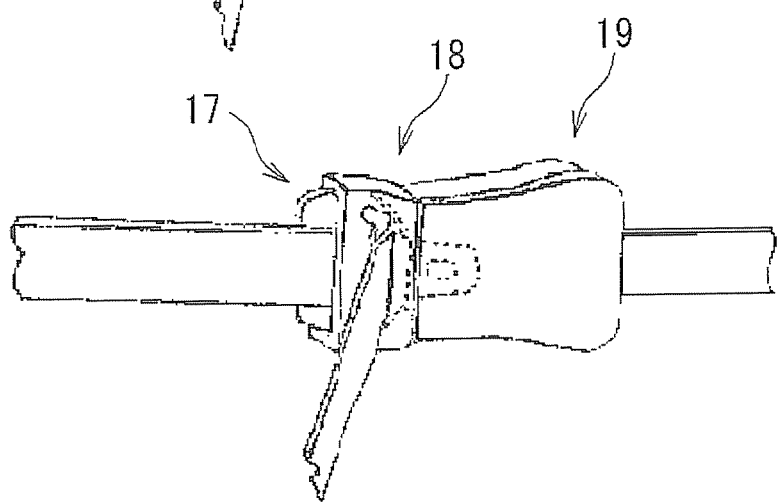

As shown in FIG. 16, the first fixation member 18 that is located on one end of the fixation belt 11a is used so that it is positioned between the insert tongue 17 and the receiving buckle 19 of the seat belt attachment/detachment mechanism. As was described in (F) above for the first embodiment, the tongue insert piece 17b is inserted into the first fixation member 18 from the opening surface of the first fixation member 18. When doing this, the tongue grip section 17a is stopped by the tongue receiving section 18b, so that only the tongue insert piece 17b passes through the first through hole 18a that is formed in the surface on the opposite side from the opening surface. Also, the tongue insert piece 17b is inserted into the receiving hole 19a that is formed in the seat belt buckle 19 and is fastened to the buckle 19.

As shown in FIG. 15, the body fixation member 4 is such that it comes in close contact with only the stomach area of the crewmember or passenger that is holding the infant, and is attached to the seat belt taking the best way or achieving balance into consideration. Furthermore, the body fixation member 4 is used while holding the infant with both arms. The length of the fixation belt 11a is adjusted by a length adjustment fixture 11e according to the size of the infant and the physique of the crewmember or passenger holding the infant.

As methods for using the body fixation member is a method of using it with the infant laying in a horizontal position, a method of holding the infant an upright position facing the adult, or a method of holding the infant upright position so that the infant faces in the same direction as the crewmember or passenger holding the infant, however, the method of using it with the infant laying in a horizontal position is recommended.

As in the first embodiment, in the case of fixing an infant alone to a seat belt, the fixation belt 11a is used to fix the body fixation member 4 to the seat, and furthermore, it is recommended that a second auxiliary fixation belt 11c be used to fix to a suitable place in the vehicle. Here, the second auxiliary fixation belt 11c comprises fastening member 11d that are attached to both ends of the belt 11.

Third Embodiment

A third embodiment of the present invention will be explained using FIG. 20. The auxiliary seat belt device of this third embodiment of the invention is used together with a normal 2-point seat belt.

The auxiliary seat belt is used together with a 2-point seat belt such as the normal middle backseat seat belt of an automobile, or an airplane seat belt. The seat belt aid comprises a fixation belt 11a that has a first fastening member 11d such as a hook on one end, and a first fixation member 8 on the other end. Here, the first fastening member 11d can be attached to or detached from a specified location in the vehicle such as a hand strap or headrest support bar 12b that supports a headrest 12a. The insert tongue 2 and receiving buckle 3 of the attachment/detachment mechanism of the seat belt fasten together with the first fixation member 8 located in between. The first fixation member 8 does not interfere with the operation and function of the attachment/detachment mechanism of the seat belt 1, so the tongue 2 and buckle 3 can be attached or detached, and securely fit together.

As shown in FIG. 20, when using the auxiliary seat belt device, the first fastening member 11d that is located on one end of the belt 11a is attached to the headrest support bar 12b, and the first fixation member that is located on the other end is fixed between the attachment/detachment mechanism that is located in the vehicle as was explained in the first and second embodiments. The explanation of the detailed method of use of the first fixation member 8 is the same as explained above so will be omitted. Not only is the fixation belt 11a used for securing an infant, but it can also be used as an auxiliary seat belt device for an adult. By using the fixation belt, it is possible to use a 2-point seat belt as a 3-point seat belt. The fixation belt 11a can also comprise a length adjustment function or an expansion and contraction function.

The body fixation member 4 is constructed so that it receives and stops shock applied to an infant during impact entirely from the backside of the body centering on the head and back. By using the body fixation member 4 together with the outer pouch 4a that wraps around the body, a back plate 5 that secures at least the head and waist, a cushion 6, and a body fixation belt 7, at least from the head to the waist is secured, and especially the neck region is stabilized.

The auxiliary seat belt device of the present invention can be used without having to modify the construction of an existing seat belt. This auxiliary seat belt device can secure an infant and the crewmember or passenger that is holding an infant to the seat without interfering with the attachment/detachment mechanism of the seat belt.

The auxiliary seat belt device of the present invention can be used with not only a normal 2-point seat belt or 3-point seat belt, but can also be used with various kinds of seat belts such as a seat belt having construction such that it can be attached or detached at a location in the center of the stomach area of a crewmember or passenger such as a seat belt used in an airplane.

In a 3-point seat belt for an automobile, the belts are wound up during impact. By using the body fixation member of the present invention, it is possible to prevent the force that winds up the belts from acting directly on the infant.

The directions that the seat belts are wound up are shown in FIG. 3. The seat belt waist section 1a and the seat belt chest section 1b are wound up in the directions indicated by the respective arrows 16.

As shown in FIG. 3, the crewmember or passenger sits in the seat 12 and holds an infant 15 on his/her lap. A headrest 12a comes in contact with the area behind the head of the crewmember or passenger 14. The body fixation member 4 that is wrapped around the infant 15 is secured by the fixation belt 11a, auxiliary fixation belt 11b and second auxiliary fixation belt 11c. The first fixation member 8 on the fixation belt 11a is fixed to the buckle 3, and the first fastening member 11d of the fixation belt 11a is fixed to the installation fixture 4e that is located on the edge of the side surface 4g of the body fixation member 4. The second fixation member 9 on the auxiliary fixation belt 11b is fixed to a location on the waist belt 1a that is on the opposite side with respect to the waist of the crewmember or passenger 14 from the first fixation member 8, and the second fastening member 11d on the auxiliary belt 11b is fixed to the installation fixture 4e that is located on the edge of the side surface 4g of the body fixation member 4. One third fastening member 11d on the second auxiliary fixation belt 11c is fixed to the handle 13 that is fixed to the seat in front, and the other third fastening member 11d on the second auxiliary fixation belt 11c is fixed to the installation fixture 4e that is located near the fold section 4h on the side surface 4g of the body fixation member 4.

Here, by attaching the other third fastening member 11d on the second auxiliary fixation belt 11c to the installation fixture 4e on the edge section of the side surface 4g of the body fixation member 4, the body fixation member 4 hangs down from the edge section on the front of the infant 15. Therefore, when a strong inertial force acts on the infant 15, the body fixation member 4 supports the infant 15 from the backside.

Figure 18:
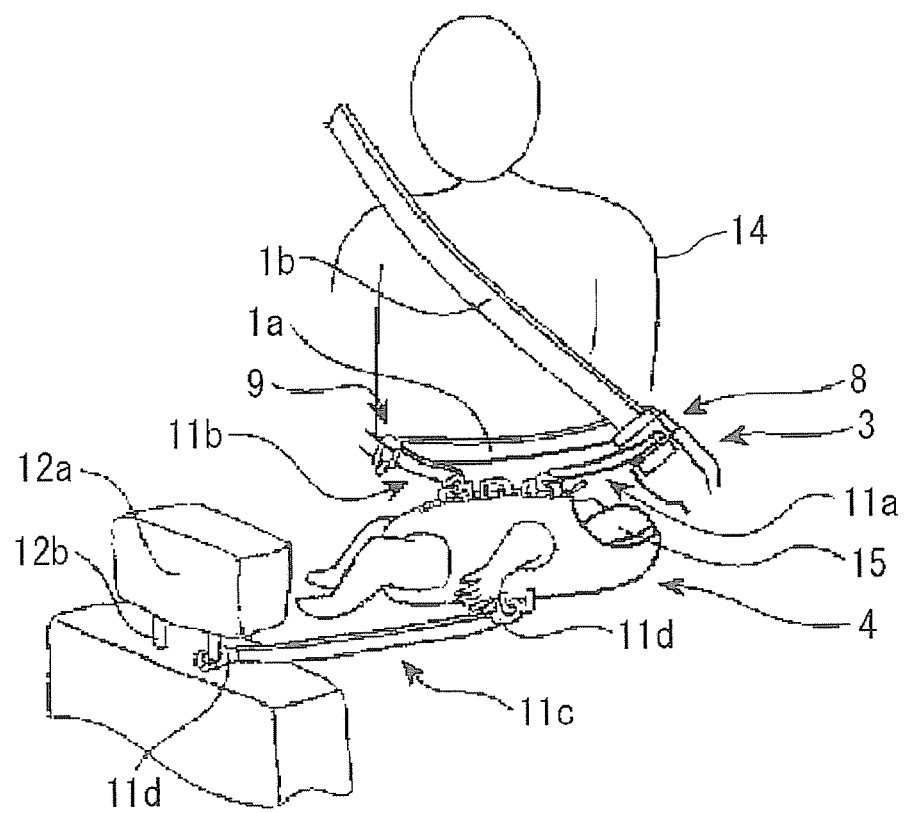
FIG. 18 shows the state in which the second auxiliary fixation belt is installed to the auxiliary seat belt.

As shown in FIG. 3, instead of fixing the fastening member 11d on the second auxiliary fixation belt 11c that is not attached to the body fixation member 4 to the hand grip 13, it is possible, as shown in FIG. 18, to fix it to the headrest support bar 12b that supports the headrest 12a of the seat in front. In this case as well, the fastening member 11d on the second auxiliary fixation belt 11c that is not fixed to the headrest support bar 12b can be attached to the installation fixture 4e on the edge of the side surface 4g of the body fixation member 4.

Attachment and detachment of the auxiliary seat belt device of the present invention can be performed very easily. By pressing the lock release button 3a shown in FIG. 1, the first fixation member 8 becomes separated from the buckle 3 together with the tongue 2. The second fixation member 9 is separated from the seat belt by pulling out the fixation piece 10.

By forming the insert rod 10b of the fixation piece 10 so that it becomes narrower going from the base section that is joined to the grip section 10a toward the tip end, it is possible to easily pull out the fixation piece 10 from the loop 9e. Also, by holding the grip section 10a and turning the fixation piece 10 inside the loop 9e, the seat belt 1 that is tightened around the insert rod 10b becomes loose, and is becomes easy to pull out the fixation piece 10 from the loop 9e. By making the width of the grip section 10a larger than the width of the insert rod 10b, it is possible to rotate the fixation piece 10 with little force.

As shown in FIG. 1, when the body fixation member 4 is secured at two points by the fixation belt 11a and auxiliary fixation belt 11b, the same effect of securing to the seat as a seat belt in a vehicle can be expected. As shown in FIG. 3, by further connecting the body fixation member 4 to a suitable place in the vehicle by a second auxiliary fixation belt 11c and securing the body fixation member 4 at three points or more, the body fixation member 4 is fixed more securely. By using a second auxiliary fixation belt 11c, the weight of the infant on the crewmember or passenger holding the infant is lightened, and it is possible to keep the infant in a comfortable position as if leaning the backrest of a reclining seat, so even use over a long period of time is comfortable.

As shown in FIG. 20, the fixation belt 11a and auxiliary fixation belt 11b can be used for securing a crewmember or passenger to a seat.

What is claimed is:

1. A seat belt auxiliary device which is removably secured to a vehicle seat belt and that is installed in said seat belt by connecting together a tongue that is installed in the seat belt and has a grip section and a tongue insert piece, and a buckle that has a receiving hole into which the tongue insert piece of said tongue is inserted, comprising:

a first belt;

a first fixation member that is attached to one end of said first belt and is box-shaped with the top surface of said first fixation member open, has a first through hole passed by said tongue insert piece in the bottom surface of said first fixation member, and has a receiving section in which the grip section of said tongue is locked in said tongue side;

a first fastening member that is attached to the other end of said first belt;

a second belt;

a second fixation member that is attached to one end of said second belt;

a second fastening member that is attached to the other end of said second belt; and a body fixation member that is connected to said first belt or said second belt, and is attached to an infant; wherein said first fixation member is connected to said buckle together with said tongue, in the state of being attached between said buckle and said tongue, when said grip section is locked in said receiving section, with said tongue insert piece passing through said first through hole and inserted into the receiving hole of said buckle, said first fastening member or said second fastening member is operative to be attached to said body fixation member;

said second fixation member comprises: a flat plate member in which a second through hole through which said seat belt can pass in the state of being folded is provided, and a fixation piece that is a different object from said flat plate member is connected to said flat plate member and that is longer than the opening length in the opening section of said second through hole; and said second fixation member is fixed to said seat belt by said seat belt passing through said second through hole in the state of being folded, by said fixation piece being inserted into the loop formed by the folded section, and by said fixation piece being restrained in said loop by said seat belt being pulled, said body fixation member comprises an outer pouch bottom surface section and outer pouch side surface sections that are attached respectively on both sides of said outer pouch bottom surface section having holes through which the infant's arms are passed; and said outer pouch bottom surface section comprises a rigid plate and a cushion.

2. The seat belt auxiliary device of claim 1 wherein said body fixation member comprises: two shoulder fixation belts having shoulder fixation belt insert pieces on free ends, and a waist fixation belt having a locking mechanism to connect with said shoulder fixation belt insert pieces attachably/detachably on the free ends.

* * * * *

UNITED STATES PATENT AND TRADEMARK OFFICE
CERTIFICATE OF CORRECTION

PATENT NO. : 7,784,873 B2  Page 1 of 1
APPLICATION NO. : 11/719990
DATED : August 31, 2010
INVENTOR(S) : Nagao It is certified that error appears in the above-identified patent and that said Letters Patent is hereby corrected as shown below:

On the title page item (22) delete PCT Field: "Nov. 24, 2005" and insert item (22) PCT Field: -- Nov. 22, 2005

Signed and Sealed this
Twenty-sixth Day of April, 2011

David J. Kappos
*Director of the United States Patent and Trademark Office*